United States Patent [19]

Weiler

[11] Patent Number: 5,595,314
[45] Date of Patent: Jan. 21, 1997

[54] TORQUE-RESISTANT CLOSURE FOR A HERMETICALLY SEALED CONTAINER

[75] Inventor: Gerhard H. Weiler, South Barrington, Ill.

[73] Assignee: Automatic Liquid Packaging, Inc., Woodstock, Ill.

[21] Appl. No.: 377,814

[22] Filed: Jan. 25, 1995

Related U.S. Application Data

[63] Continuation-in-part of Ser. No. 253,111, Jun. 2, 1994.

[51] Int. Cl.⁶ .................................................. B65D 1/02
[52] U.S. Cl. ...................... 215/50; 141/329; 215/247; 215/357; 215/355; 215/251; 604/86; 604/256; 604/415
[58] Field of Search ................ 215/50, 51, 358, 215/33, 296, 297, 303, 299, 300, 305, 354, 355, 357, 247, 364, 249, 251; 604/415, 88, 86, 87, 256; 141/384, 372, 364, 319, 329

[56] References Cited

U.S. PATENT DOCUMENTS

| | | | |
|---|---|---|---|
| 2,847,007 | 8/1958 | Fox | 604/409 |
| 3,356,244 | 12/1967 | Witchell | 215/32 |
| 4,176,755 | 12/1979 | Winchell | 215/32 |
| 4,261,474 | 4/1981 | Cohen | 215/247 X |
| 4,294,250 | 10/1981 | Dennehey | 128/247 |
| 4,463,862 | 8/1984 | Hansen | 215/33 |
| 4,526,279 | 7/1985 | Weiler et al. | 215/32 |
| 4,569,456 | 2/1986 | Weiler et al. | 215/251 |
| 4,607,868 | 8/1986 | Harvey et al. | 604/241 |
| 4,723,672 | 2/1988 | Puma | 215/50 X |
| 4,735,608 | 4/1988 | Sardam | 604/411 |
| 4,821,897 | 4/1989 | Weiler | 215/32 |
| 4,901,873 | 2/1990 | Weiler | 215/32 |
| 5,060,827 | 10/1991 | Segati | 222/562 X |
| 5,135,513 | 8/1992 | Meyer et al. | 604/411 |
| 5,156,598 | 10/1992 | Skakoon et al. | 604/411 |
| 5,257,650 | 11/1993 | Fisk et al. | 141/319 X |
| 5,395,365 | 3/1995 | Weiler et al. | 604/415 |

FOREIGN PATENT DOCUMENTS 2501428   8/1975   Germany ................... 335/128

Primary Examiner—Allan N. Shoap
Assistant Examiner—Robin A. Hylton
Attorney, Agent, or Firm—Olson & Hierl, Ltd.

[57] ABSTRACT

An improved closure insert is provided for throat region of a blow-molded container. This closure insert is provided with a scabrous perimeter and is permanently molded into the container throat region during container formation from a parison. The resulting seal resists loosening or disturbance when off-axis force or torque force is applied to the closure insert during container opening. The closure insert can be a subassembly constituted by removable parts that provide a variety of access options to the container contents.

12 Claims, 5 Drawing Sheets

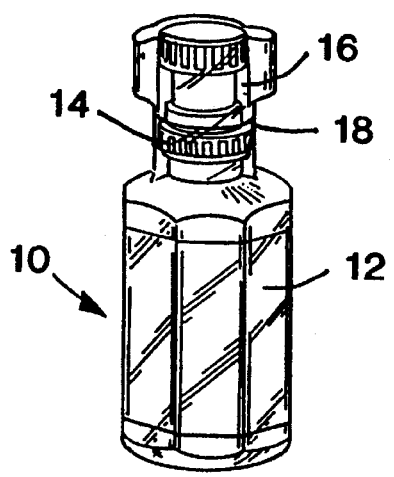
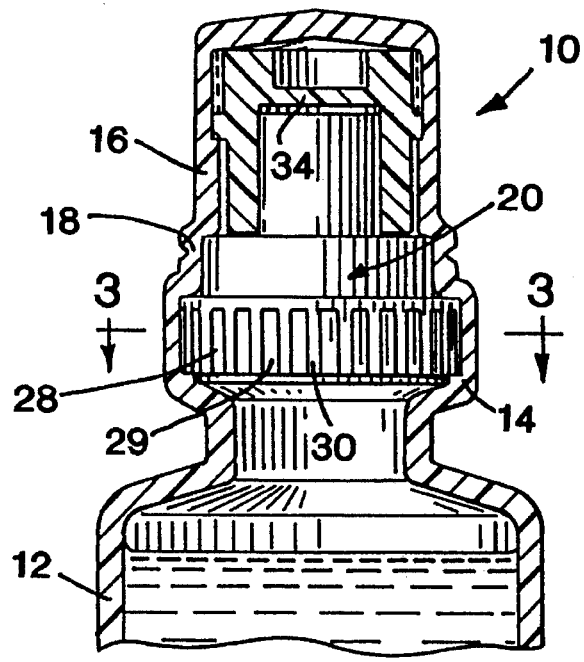
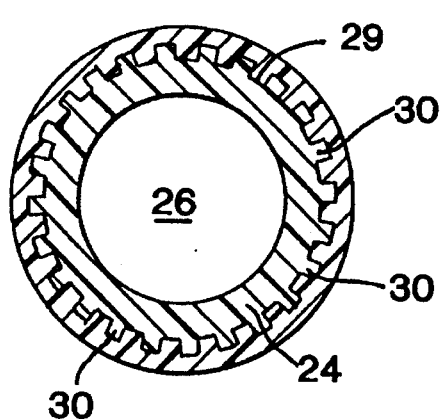
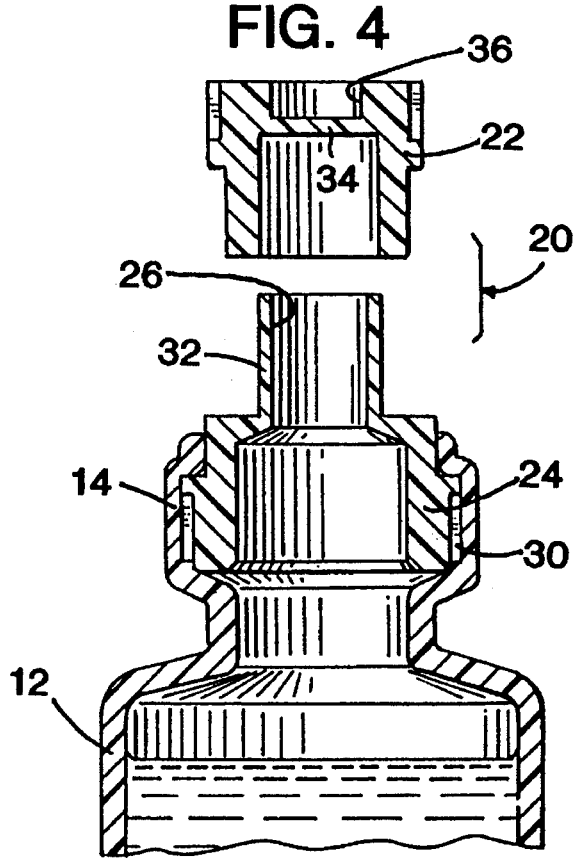
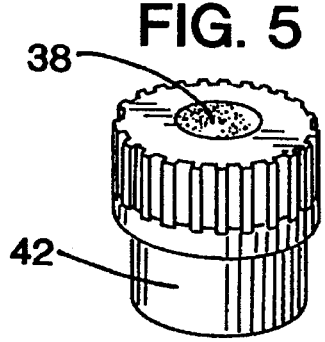

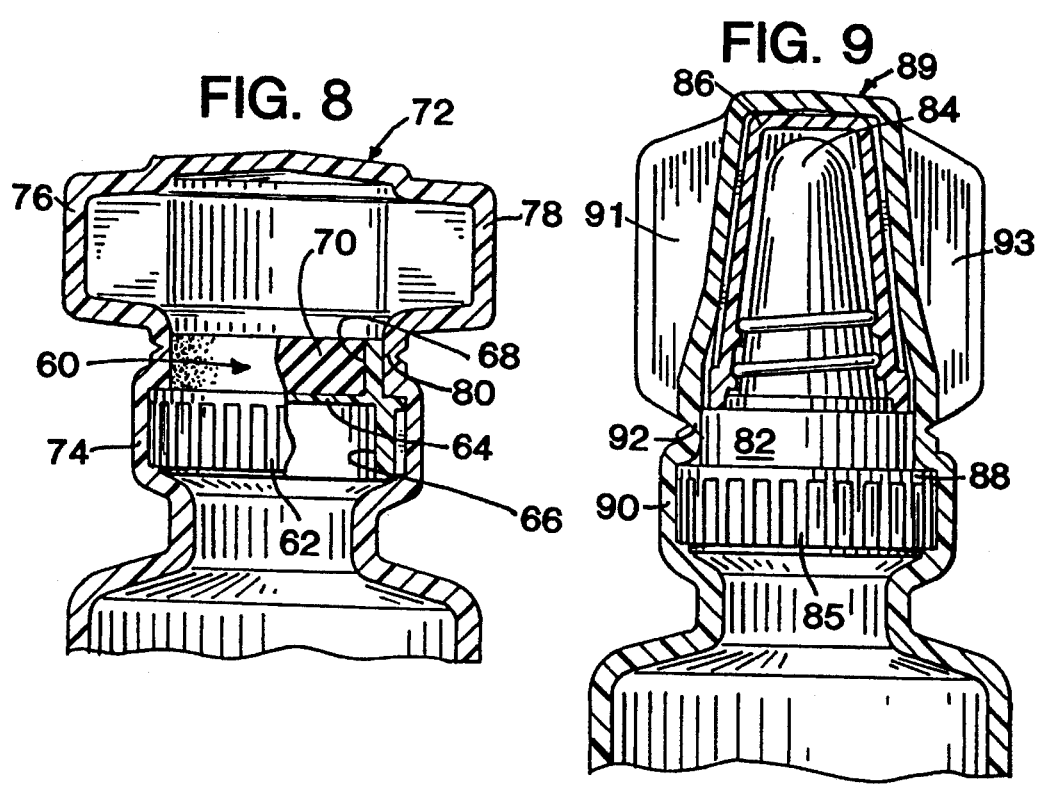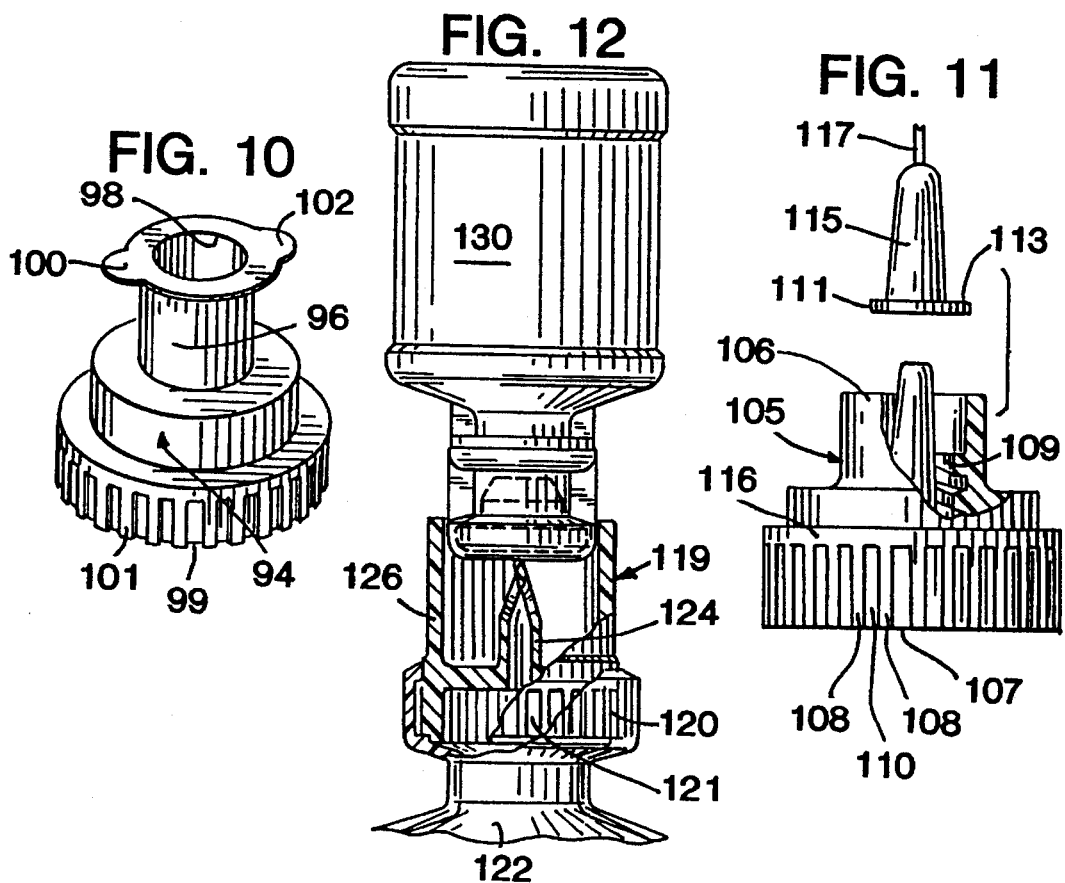

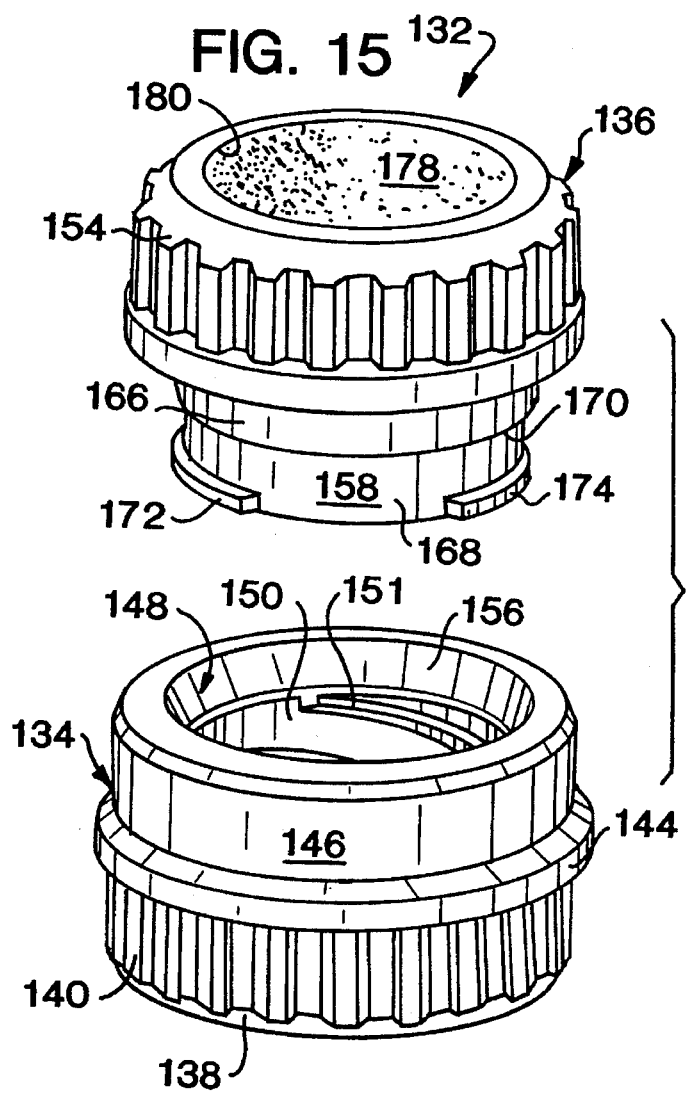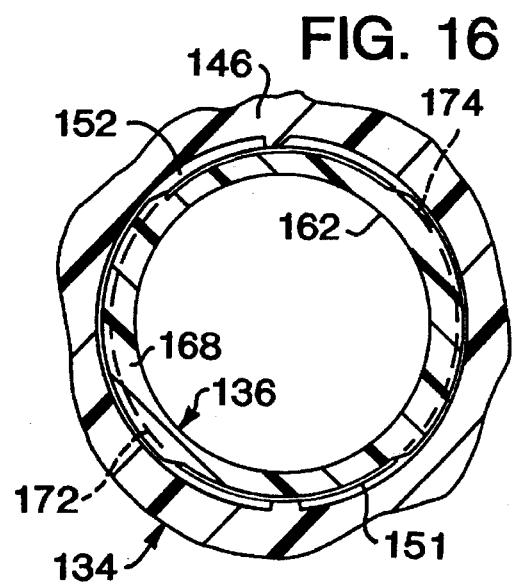

TORQUE-RESISTANT CLOSURE FOR A HERMETICALLY SEALED CONTAINER

CROSS-REFERENCE TO RELATED APPLICATIONS

This application is a continuation-in-part of U.S. patent application Ser. No. 08/253,111 filed Jun. 2, 1994.

FIELD OF THE INVENTION

This invention relates to improved closures for the throat region of hermetically sealed, blow-molded containers and in particular to blow molded, filled and sealed container structures that incorporate such closures.

BACKGROUND OF THE INVENTION

Hermetically-sealed containers can be readily produced by the so-called blow/fill/seal techniques. Utilizing such techniques, a container body is first blow molded from an extruded parison segment, then charged (or filled) with a desired liquid or solid contents, and thereafter immediately sealed by a preformed insert while additionally molding the parison segment at the container neck and throat region about the inserted, preformed closure subassembly. See, for example, the container structure disclosed in U.S. Pat. No. 4,596,110 to Weiler.

The hermetically sealed container structures that result from such a blow, fill and seal container molding procedure, especially those with a removable overcap as shown in the aforementioned patent, are very useful and have come into widespread usage. However, under certain conditions of relatively extreme usage, the preformed, inserted closure can become disengaged or loosened from its engagement with the material forming the container throat region. Such disengagement not only raises the risk of environmental contamination of the container contents, but also can cause dispensing problems when the container contents is about to be used after the container has been opened by twisting off the overcap that protects the insert. Examples of such extreme usage conditions include excessive torque applied to the inserted closure or an excessive force applied in a direction away from the container longitudinal axis.

A practical means for overcoming this loosening problem is needed and has been diligently sought, but has not been easy to achieve. However, the present invention provides a practical solution to this problem and permits the utilization of a wide variety of pre-molded inserts in conjunction with hermetically sealed, molded containers.

SUMMARY OF THE INVENTION

The present invention contemplates a preformed closure insert permanently received in the neck portion of a container formed from a thermoplastic material wherein the insert is provided about the perimeter thereof with a scabrous surface that provides increased contact area between the insert and the inner surface of the container neck or throat portion contiguous therewith. The aforementioned scabrous surface can be in the form of a band of substantially axially extending and circumferentially spaced ribs, can be knurled, serrated, undulating, or otherwise roughened.

The closure insert can be a single piece molded item such as a nozzle with or without a pierceable membrane, or a subassembly constituted by two or more parts.

A container embodying the present invention is made from thermoplastic material and comprises a body portion that defines an access opening at one end and terminates in a neck portion unitary therewith and further defining an open throat region. A closure insert of the type described hereinabove and provided with a scabrous perimeter surface is situated within the open throat region and in sealing contact with the thermoplastic material that defines the neck portion. A cover structure unitary with the container neck portion encapsulates the closure insert and is constituted by a removable overcap delineated from the neck portion by a frangible web that abuts the insert article above the scabrous perimeter surface and eliminates touch contamination of the dispensing aperture or nozzle.

BRIEF DESCRIPTION OF THE DRAWINGS

In the drawings,

FIG. 1 is a perspective view of one. embodiment of a container structure of the invention in its blow molded, filled and sealed configuration;

FIG. 2 is an enlarged fragmentary sectional view of the container structure of FIG. 1 in elevation;

FIG. 3 is a sectional view taken along the plane 3—3 of FIG. 2;

FIG. 4 is a view similar to FIG. 2, but with all portions in section, the overcap broken away and removed, and the closure subassembly exploded;

FIG. 5 is an enlarged perspective view of a cap provided with a pierceable multiple entry membrane;

FIG. 8 is a fragmentary elevational view, partly in section, showing an alternative embodiment of a container structure of this invention;

FIG. 9 is a fragmentary elevational view, partly in section, showing yet another embodiment of a container structure of this invention;

FIG. 10 is a perspective view of an insert suitable for practicing the present invention and showing a male luer lock connector provided with external lugs;

FIG. 11 is a side elevational view, partly in section, and showing a male luer lock connector or the like provided with internal threads for engaging a hypodermic needle;

FIG. 12 is a side elevational view, partly in section and showing a spike surrounded by a skirt for guidance and equipped with a scabrous perimeter surface in accordance with the present invention;

FIG. 15 is a perspective, exploded view of the base member and multiple entry closure member of the closure insert shown in FIGS. 13 and 15; and FIG. 16 is a sectional view taken along the plane 16—16 of FIG. 13.

DETAILED DESCRIPTION OF PREFERRED EMBODIMENTS

Figure 6:
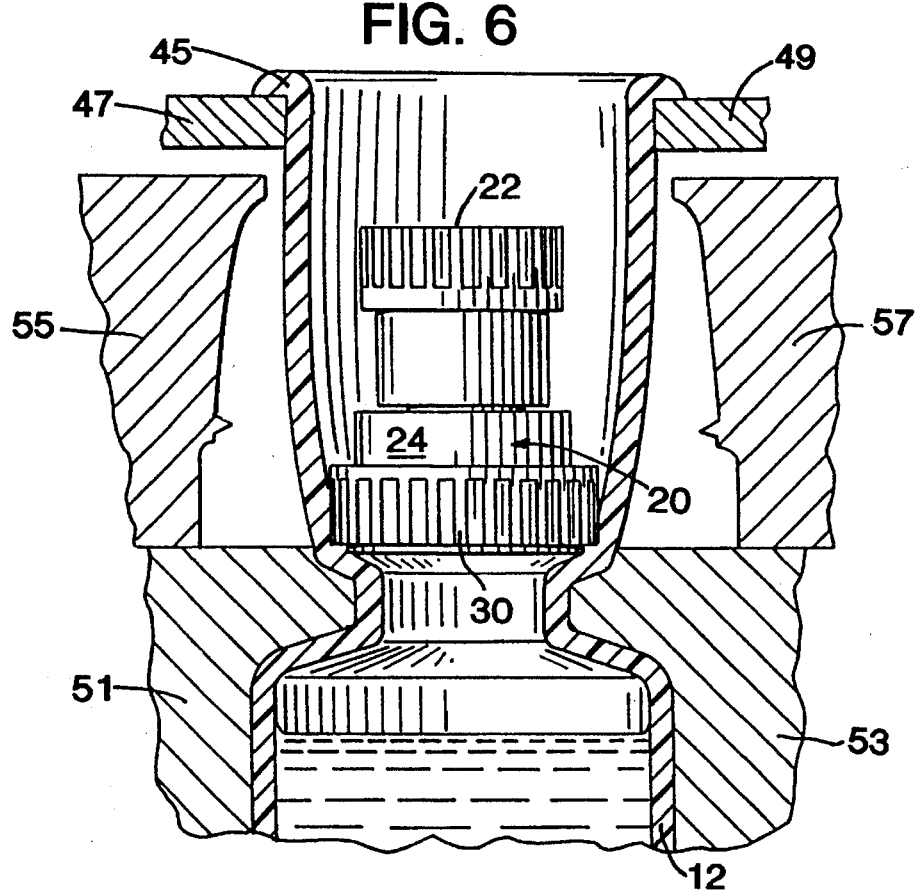
FIG. 6 is an elevational view showing a parison section partly molded and with a closure insert subassembly positioned in the container throat region.

Referring to FIGS. 1 and 2, a hermetically sealed, thermoplastic container 10 embodying the present invention includes a body portion 12, terminating in a neck portion unitary therewith that also defines a throat portion 14 unitary with the neck portion and extending away from the neck portion in a direction away from the body portion 12, and a removable overcap 16 unitary with throat portion 14 and delineated by frangible web 18. Received within throat portion 14 is closure insert 20 constituted by a cap 22 and hollow body 24 (FIGS. 2 and 4) that defines an open, axial access passageway 26 to container body portion 12. Hollow body 24 is provided with a band of scabrous perimeter surface 28 into which is molded the thermoplastic material from which container 10 is fabricated.

The thermoplastic material can be a conventional molding material such as high density polyethylene, low density polyethylene, polypropylene, and the like, compatible with the contemplated container contents. Containers embodying the present invention can have a wide variety of shapes and capacities.

The closure inserts contemplated by the present invention are preformed, for example by injection molding, and can have a wide variety of dispensing configurations depending upon contemplated end use. Single piece inserts as well as subassemblies are contemplated, as will be discussed and illustrated in greater detail hereinbelow. However, in all instances the closure insert is provided with a scabrous perimeter, e.g., ribbed, knurled, serrated, etc., that provides an increased surface area for intimate contact with the thermoplastic container material during molding. The scabrous surface is rough to the touch because of the bumps or projections that are present. The semisoft thermoplastic material of the container envelops these bumps or projections during molding and effectively immobilizes the insert within the throat or neck of the container.

The scabrous outer perimeter surface 28 of closure insert 20, shown in FIGS. 2, 3 and 4, is in the form of substantially uniformly spaced ribs 30 generally parallel to the longitudinal axis of access passageway 26. As best seen in FIG. 3, the thermoplastic material of container throat portion 14 fills completely the interstices or channels 29 between adjacent ribs 30 and immobilizes the insert by forming a permanent seal between the closure insert 20 and throat portion 14 during molding. Moreover, the scabrous perimeter surface of the closure insert permits more of the thermoplastic material to be retained in the container throat region as the material is compressed about the insert during molding. This, in turn, thickens the container wall about the insert and thereby rigidifies and strengthens the throat region against later dislodgement of the closure insert as the container is being opened in preparation for use.

The scabrous perimeter surface of the closure insert provides an actual contact surface area that is considerably larger than the apparent contact surface area therebetween. Preferably, the actual-to-apparent contact surface area ratio is at least about 3.

Closure insert 20 is a subassembly that includes removable cap 22 for sealing access passageway 26. Cap 22 is also provided with a ribbed external surface into which a portion of overcap 16 is molded so that cap 22 is in intimate contact with and can be removed together with overcap 16 when frangible web 18 is severed. If, on the other hand, it is preferred for cap 22 to remain in place, maintaining access passageway 26 sealed while and after overcap 16 is removed, overcap 16 is molded in a known manner in a hollow configuration so as to remain spaced from cap 22 as the container is fabricated.

In the latter case, access to container contents can be gained in several ways, to wit, by removing the cap 22 from stem 32, as illustrated in FIG. 4, or by perforating membrane or web 34 in cap recess 36 by means of a draining spike or a cannula. Stem 32 can have controlled inside and/or outside diameters, luer tapers, and the like features to facilitate interconnection with other receptacles or dispensing devices.

For multiple entries into container contents without removal of cap 22 from stem 32, cap recess can be filled with an elastomeric material 38, e.g., rubber, as illustrated in FIG. 5 for cap 42 which cap in all other respects is the same as cap 22 shown in FIGS. 2 and 4.

Figure 7:
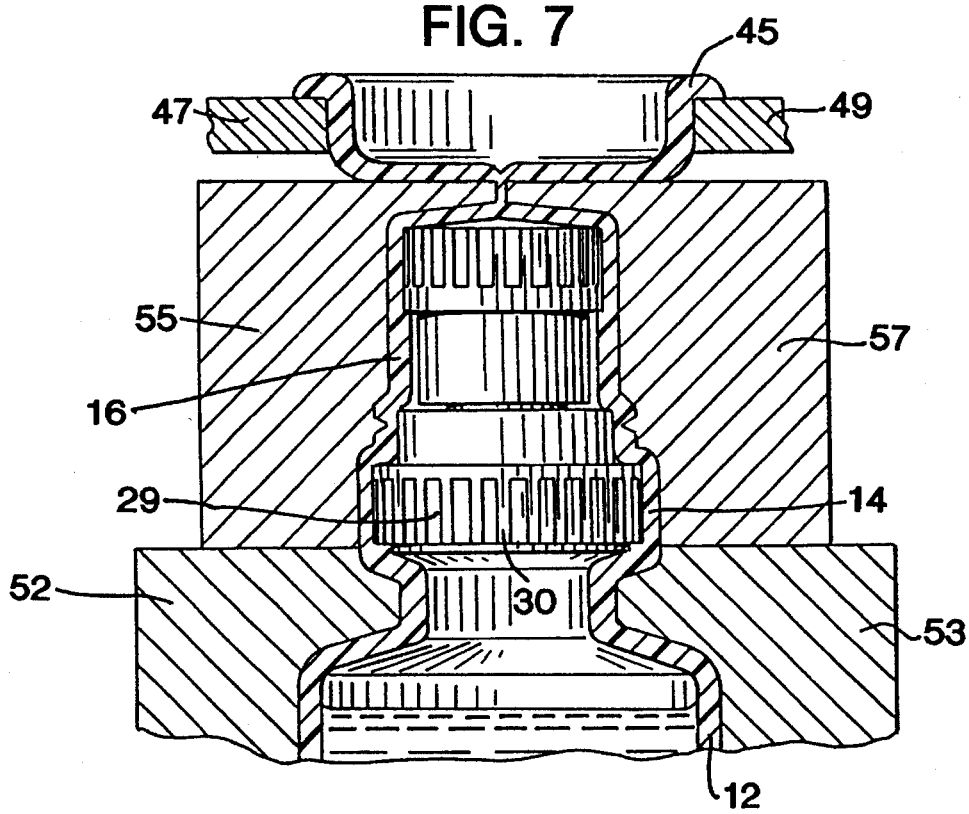
FIG. 7 is an elevational view similar to that of FIG. 6 but showing the parison section fully molded about the closure insert subassembly.

The insertion of a preformed closure insert 20 into a thermoplastic container during container fabrication is illustrated in FIGS. 6 and 7. An extruded parison segment 45 is held by vacuum assisted holding jaws 47 and 49 in position between main mold halves 51 and 53 as container body portion 12 is formed in a known manner, for example, as described in U.S. Pat. No. 4,901,873 to Weiler et al. Thereafter, preformed closure insert 20 is positioned as shown in FIG. 6. Next, sealing mold halves 55 and 57 are moved inwardly toward one another (FIG. 7) to compress the remaining, upper parison portion about closure insert 20 so as to form throat region 14 as well as overcap 16 while urging the thermoplastic material of the parison into the interstices between adjacent longitudinal ribs 30. In this manner a closure insert is effectively and expeditiously permanently secured within throat region 14.

FIGS. 8 through 12 illustrate the diverse types of closure inserts that can be accommodated while utilizing the present invention.

Referring to FIG. 8, closure insert 60 is a hollow, substantially cylindrical segment provided with spaced, longitudinally extending ribs 62 about its periphery. Pierceable, non-coring membrane 64 extends across insert 60 to seal access passageway 66. A rubber composition 70 fills outer recess 68 for multiple entry applications. Hollow overcap 72, unitary with throat region, protects pierceable insert 60 against contamination. Overcap 72 can be removed by grasping wings 76 and 78 and twisting so as to break frangible web 80.

FIG. 9 shows closure insert subassembly 82 that comprises nozzle 84 equipped with a threaded protective cap 86. Base 88 of nozzle 84 is provided with peripheral, spaced ribs 85 in intimate contact with throat region 90. Hollow overcap 89 is unitary with container throat region 90 and is connected thereto by frangible web 92. Wings or tabs 91 and 93 on overcap 89 facilitate its manipulation, especially by senior citizens or those suffering from arthritis, when readying nozzle 84 for dispensing of container contents.

FIG. 10 illustrates a closure insert provided with several interconnecting means. In particular, closure insert 94 comprises hollow stem 96 that defines access aperture 98 having a controlled inside diameter, e.g., a luer taper for receiving a luer fitting. Stem 96 terminates in outwardly extending lugs 100 and 102 sized to engage luer lock threads, e.g., of the type shown in FIG. 11. Base 99 of insert 94 is provided with peripheral, axially aligned and spaced ribs 101 for engaging the thermoplastic material of a container throat region and receiving some of the thermoplastic material therebetween.

FIG. 11 shows a male luer lock connector 105 having a ribbed base 107 and equipped with internal threads 109 for engaging lugs 111 and 113 on hub 115 on hypodermic needle 117. Ribbed base 107 is provided with a plurality of spaced, substantially parallel ribs 108 with channels or interstices 110 therebetween. Ribs 108 merge into a common solid peripheral band or ring 116 at the upper portion of base 107 and unitary therewith. Fitments other than a luer lock connector can be provided in a like manner, as desired, to facilitate the dispensing of the container contents. For example, the outer surface 106 of connector 105 can receive in a mating relationship one end of tubing.

FIG. 12 shows a spike connector 119 having a ribbed base 121 of similar configuration to that shown in FIG. 11 and embedded in throat region 120 of thermoplastic container 122. Transfer spike 124 is surrounded by guide skirt 126 which facilitates the penetration of spike 124 into a stoppered container 130 so as to drain the contents thereof as container 130 is urged against spike 124.

FIGS. 13–16 depict a closure insert 132 in the form of a subassembly including a base member 134 and a removable closure member such as multiple entry closure member 136.

Figure 13:
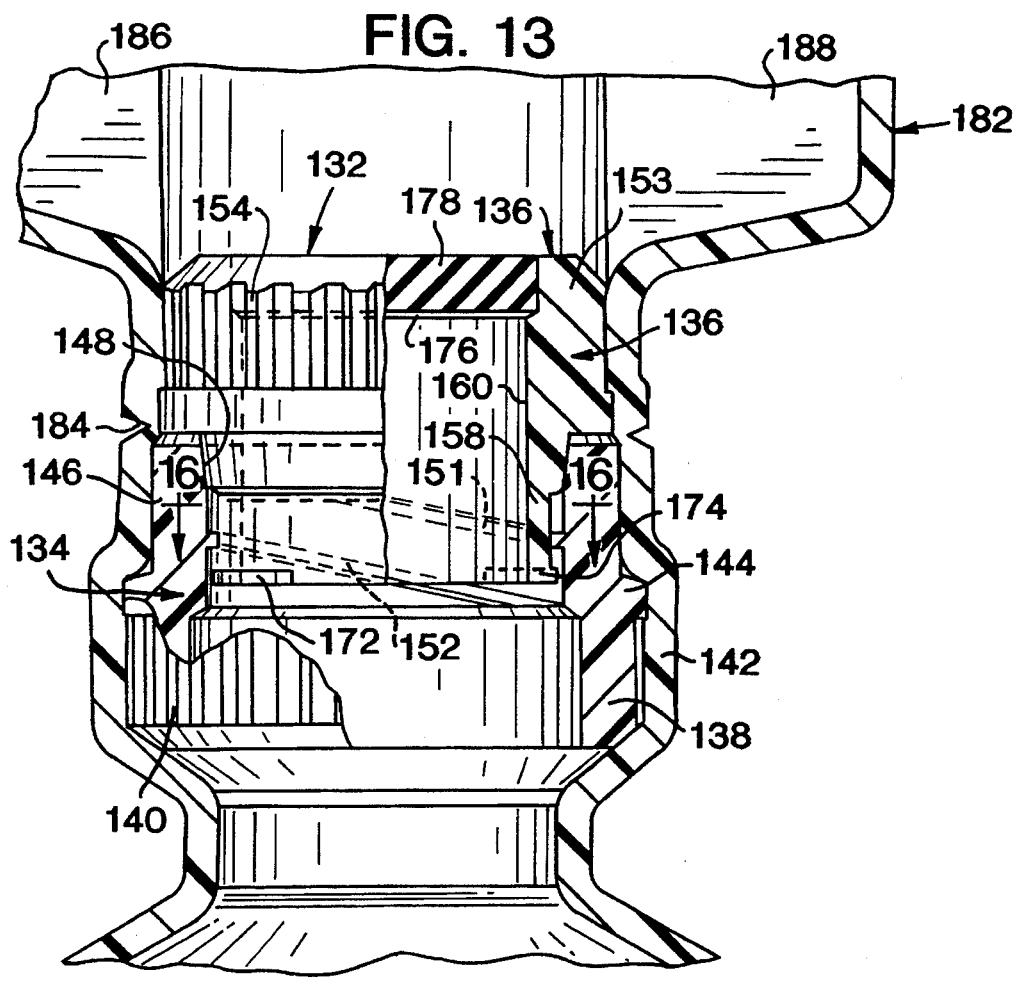
FIG. 13 is a fragmentary elevational view, partly in section, showing yet a further alternative embodiment of a container structure of this invention.
Figure 14:
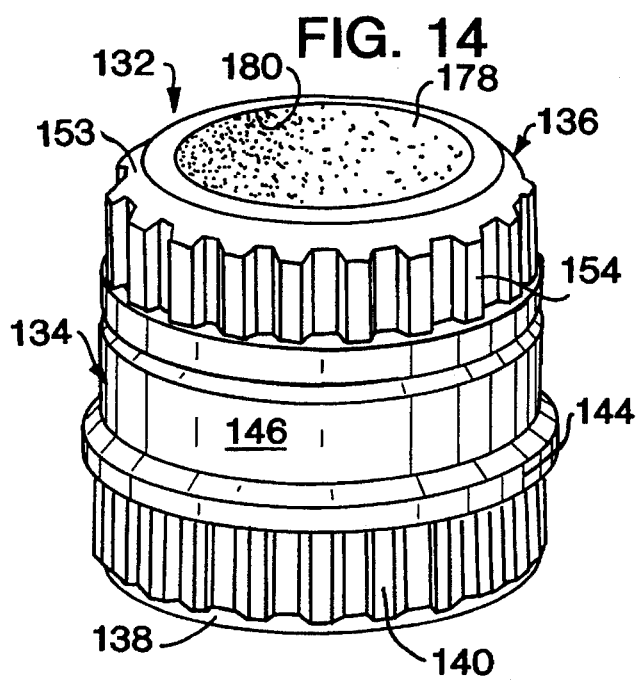
FIG. 14 is a perspective view of the closure insert shown in FIG. 13.

Referring to FIGS. 13 and 14, base member 134, which is substantially cylindrical, includes a cylindrical skirt portion 138 which is immobilized within the throat region 142 of the container and is provided with a scabrous perimeter surface such as that defined by peripheral, spaced longitudinally positioned ribs 140 in intimate contact with throat region 142 and extending circumferentially around the periphery of skirt portion 138. Ribs 140 merge into a common solid peripheral band or ring 144 at the upper portion of skirt portion 138 and are unitary therewith. Base member 134 is further provided with a hollow, cylindrical stem 146 which extends upwardly from the ring 144 and is unitary therewith. Cylindrical stem 146 defines an access aperture 148 (FIG. 15).

Stem 146 also includes an inner surface 150 (FIG. 15) having two threads 151 and 152 (not shown) formed therein which extend circumferentially and spirally around a portion of the inner surface 150. More particularly, and referring to FIGS. 13 and 16, threads 151 and 152 are spaced apart from each other, with thread 151 extending circumferentially and spirally around approximately one half of the inner surface 150 and thread 152 extending circumferentially and spirally around the opposed half of the inner surface 150. Internally threaded stem 146 also defines a luer lock adapted to receive a hypodermic needle in a manner similar to that shown in FIG. 11.

Inner surface 150 further includes a frustoconical tapered portion 156 (FIG. 15), e.g., a luer tapered portion, adjacent to access aperture 148. Tapered portion 156 converges inwardly from access aperture 148 into the inner surface 150 of stem 146.

The multiple entry closure member 136, which preferably is substantially cylindrical, is comprised of a hollow, substantially cylindrical gripping portion 153 provided with spaced, longitudinally positioned ribs 154 which extend circumferentially around the periphery thereof. Member 136 is further provided with a hollow, substantially cylindrical stem 158 (FIG. 15) which extends downwardly from the end of gripping portion 153. As shown in FIGS. 13 and 16, the stem 158 has an inner cylindrical surface 160 defining an access passageway 162. Further, stem 158 has an outer surface with a frustoconical tapered stem portion 166 (FIG. 15), which can be a luer tapered portion complementary to tapered portion 156, converging downwardly from the end of gripping portion 153, and a cylindrical stem portion 168 (FIG. 15) extending downwardly from portion 166 and separated therefrom by a step 170 (FIG. 15). A pair of diametrically opposed lips or ridges 172 and 174 project radially outwardly from the outer surface of cylindrical stem portion 168 and extend partially around the circumference thereof. More particularly, lip 172 extends circumferentially around a portion of one side of stem portion 168 while lip 174 extends circumferentially around the side of stem portion 168 diametrically opposed to the side with lip 172. A pierceable, non-coring membrane 176 is provided across gripping portion 153 to seal the access passageway 162. An elastomeric self-sealing composition 178 fills an outer recess 180 in gripping portion 153 for multiple entry applications.

The hollow overcap 182, unitary with the throat region 142 of the container, protects the closure member 136 against contamination. The overcap 182 is connected to the throat region 142 by a frangible web 184 and is provided with wings or tabs 186 and 188 to facilitate removal thereof.

As best seen in FIGS. 13 and 15, the closure member 136 is secured to the base member 134. More particularly, the stem 158 of closure member 136 is removably received and secured within the inner surface 150 of stem 146 of base member 134. Lips 172 and 174 on stem 158 coact with threads 151 and 152 of base member 134 to provide a bayonet lock between members 134 and 136. Moreover, tapered portion 166 on stem 158 frictionally engages tapered portion 156 on stem 146.

It is understood, of course, that the bayonet and luer lock connecting means disclosed herein are but two of several known means for removably securing members such as members 134 and 136 together and that such other means are within the scope of this invention.

According to this alternative embodiment of the present invention, and to allow dispensing of the container contents, overcap 182 is first removed from the container, i.e., by grasping wings 186 and 188 thereof and twisting off so as to break frangible web 184. The container contents can then be dispensed in several different ways. Initially, the contents can be removed with a syringe or a spike through the membrane 176 of multiple entry closure member 136. Alternatively, the contents can be poured out through base member 134 by unscrewing and removing multiple entry closure member 136 from base member 134. Moreover, if only a portion of the contents have been removed or poured out, overcap 182 can be replaced on the top of closure member 136 or base member 134, respectively to protect the contents from contamination. Additionally, a hypodermic needle can be fitted to base member 134 and the contents dispensed through the needle.

The foregoing specification and the drawings are to be taken as illustrative but not limiting of the present invention. Still other closure insert configurations utilizing the spirit and scope of the present invention are possible, and will readily present themselves to those skilled in the art.

I claim:

1. A hermetically sealed container of a thermoplastic material and comprising:

(a) a body portion having an upper end terminating in a neck portion unitary therewith;

(b) a throat portion unitary with said neck portion and extending away from the neck portion in a direction away from the body portion;

(c) a preformed closure insert immobilized within said throat portion; said closure insert having an axially extending passageway defined therethrough; and (d) a removable overcap unitary with said throat portion and delineated by a peripheral frangible web circumscribing the closure insert, wherein said closure insert is a subassembly that includes a base member with a scabrous perimeter surface immobilized within said throat portion and a multiple entry closure member removably secured to said base member.

2. The container in accordance with claim 1 wherein said scabrous perimeter surface is defined by axially aligned ribs spaced from one another.

3. The container in accordance with claim 1 wherein the thermoplastic material in the throat portion of the container is in intimate contact with said scabrous perimeter surface.

4. The container in accordance with claim 1 wherein said scabrous perimeter surface is defined by axially aligned, spaced ribs and wherein spaces between said ribs are filled by the thermoplastic material.

5. The container in accordance with claim 1 wherein said base member and said multiple entry closure member have luer tapered portions in contact with each other.

6. The container in accordance with claim 1 wherein said scabrous perimeter surface has an actual-to-apparent contact surface ratio of at least about 3.

7. The container in accordance with claim 1 wherein said removable overcap is in intimate contact with a removable portion of a closure insert subassembly.

8. A hermetically sealed container of a thermoplastic material and comprising:

(a) a body portion having an upper end terminating in a neck portion unitary therewith;

(b) a throat portion unitary with said neck portion and extending away from the neck portion in a direction away from the body portion; and (c) a closure insert subassembly including a base member having a scabrous perimeter surface in intimate contact with the thermoplastic material immobilized within said throat portion and a multiple entry closure member removably secured to said base member.

9. A hermetically sealed container of a thermoplastic material and comprising:

(a) a body portion having an upper end terminating in a neck portion unitary therewith;

(b) a throat portion unitary with said neck portion and extending away from the neck portion in a direction away from the body portion; and (c) a closure insert subassembly including a base member immobilized within said throat portion and a multiple entry closure member removably secured to said base member, wherein said base member includes a base immobilized within said throat portion and a stem extending unitarily from the base and defining an access aperture, said multiple entry closure member including a gripping portion and a stem extending unitarily from the gripper portion and defining an access passageway, said stem of said closure member being removably secured within said stem of said base member.

10. The container in accordance with claim 9 wherein said stem of said base member includes an inner surface having a pair of spaced apart threads extending circumferentially and spirally around a portion thereof, said stem of said closure member including an outer surface having a pair of lips projecting outwardly therefrom and extending partially circumferentially around a portion thereof, said lips being engaged between said pair of threads when said base member and said closure member are removably secured to each other.

11. The container in accordance with claim 9 wherein said stem of said base member and said stem of said closure member have luer tapered portions in contact with one another.

12. A hermetically sealed container of a thermoplastic material and comprising:

(a) a body portion having an upper end terminating in a neck portion unitary therewith;

(b) a throat portion unitary with said neck portion and extending away from the neck portion in a direction away from the body portion;

(c) a closure insert subassembly including a base member with a scabrous perimeter surface immobilized within said throat portion and a multiple entry closure member removably secured to said base member; and (d) a removable overcap unitary with said throat portion and covering said multiple entry closure member, said overcap being delineated by a peripheral frangible web circumscribing said multiple entry closure member.

* * * * *